(12) United States Patent
Brahmbhatt et al.

(10) Patent No.: US 12,210,645 B1
(45) Date of Patent: Jan. 28, 2025

(54) INFORMATION COMPARTMENTALIZING DATA STORE

(71) Applicant: MORGAN STANLEY SERVICES GROUP INC., New York, NY (US)

(72) Inventors: Suryakant Brahmbhatt, East Windsor, NJ (US); Sanjit Mehta, Bengaluru (IN); Mehak Mehta, Jersey City, NJ (US); Rahul Suresh, Bengaluru (IN)

(73) Assignee: MORGAN STANLEY SERVICES GROUP INC., New York, NY (US)

( * ) Notice: Subject to any disclaimer, the term of this patent is extended or adjusted under 35 U.S.C. 154(b) by 0 days.

(21) Appl. No.: 18/783,300

(22) Filed: Jul. 24, 2024

(51) Int. Cl.
G06F 21/62 (2013.01)
G06F 21/10 (2013.01)

(52) U.S. Cl.
CPC ...... G06F 21/6218 (2013.01); G06F 21/1014 (2023.08)

(58) Field of Classification Search
None
See application file for complete search history.

(56) References Cited

U.S. PATENT DOCUMENTS

| | | | |
|---|---|---|---|
| 9,288,184 B1 | 3/2016 | Kvamme et al. | |
| 10,685,139 B2 * | 6/2020 | Harp | G06F 21/78 |
| 11,522,697 B2 | 12/2022 | Zimmer et al. | |
| 2008/0270802 A1 | 10/2008 | Ashley et al. | |
| 2015/0213288 A1 | 7/2015 | Bilodeau et al. | |
| 2017/0126681 A1 * | 5/2017 | Barrett | H04L 9/3226 |
| 2018/0285599 A1 | 10/2018 | Praveen et al. | |
| 2019/0379642 A1 | 12/2019 | Simons et al. | |
| 2020/0193057 A1 | 6/2020 | Yu et al. | |
| 2021/0097197 A1 | 4/2021 | Kulkarni et al. | |
| 2021/0165907 A1 | 6/2021 | Mann et al. | |
| 2021/0173854 A1 | 6/2021 | Wilshinsky | |
| 2021/0182423 A1 | 6/2021 | Padmanabhan | |
| 2021/0391040 A1 | 12/2021 | Dormer et al. | |
| 2022/0019687 A1 * | 1/2022 | Poutra | G06F 21/6245 |
| 2022/0129582 A1 | 4/2022 | Lange | |
| 2022/0138345 A1 | 5/2022 | Krishnan et al. | |
| 2022/0156406 A1 | 5/2022 | Yang | |
| 2022/0164478 A1 | 5/2022 | Fleck | |
| 2022/0207181 A1 | 6/2022 | Ng | |
| 2022/0300651 A1 | 9/2022 | Mondal et al. | |

* cited by examiner

*Primary Examiner* — Brandon Hoffman
(74) *Attorney, Agent, or Firm* — Weitzman Law Offices, LLC

(57) ABSTRACT

A computer-implemented method for extracting data from separate databases and loading the data into a central data store without introducing additional security vulnerabilities is disclosed. The method begins by receiving a configuration comprising one or more transformation functions to be applied to one or more data fields. Values of the one or more data fields are extracted from the databases for a plurality of records, the values being previously tagged with metadata indicating at least a datatype for the values. Based at least in part on the configuration and the metadata tagging, a function from the one or more transformation functions is selected for each value. A second database with a central data store is populated with transformed data. Requestors are not permitted to access to pre-transformed data in the first one or more databases while being allowed access to at least some post-transformed data in the central data store.

20 Claims, 5 Drawing Sheets

INFORMATION COMPARTMENTALIZING DATA STORE

FIELD

This disclosure relates to methods and system architectures for storage, retrieval, and processing of confidential information, and more specifically, to a configurable engine for transforming data before the data enters a data store, preserving some aspects of data while obfuscating, transforming, or removing others.

BACKGROUND

Many organizations or computing systems need to gather and store a variety of data for internal operations, reporting, and/or statistical analysis, and yet also need to protect the data from potential access by malicious software or an unauthorized system user. The need for data protection may be based on security concerns—for example, preventing an attacker from easily obtaining usernames and password hashes or hashing salts associated with the usernames, or preventing an attacker from easily obtaining the private key associated with a particular public key in an asymmetric cryptography system. Alternatively, the need for data protection may be based on legal or contractual concerns (for example, preventing access to all the ingredients in a trade secret-protected chemical formulation, preventing access to personally identifiable information (PII) that links an identity to legally protected private information, or preventing publication of material nonpublic information (MNPI) that could be used for insider trading or stock price manipulation by linking a particular asset to confidential information concerning the valuation of that asset).

There exists a common thread of each of the above examples: although the compromise of any particular piece of data on its own would be deeply unfortunate, the negative consequences of all the data being obtained at the same time would be catastrophic. An attacker who only knows hashing salts without knowing which username is associated with each will not be able to crack passwords nearly as quickly as one who does have that association. An attacker who only knows one ingredient of the trade secret cannot divulge the trade secret and destroy its value as thoroughly as one who has access to every ingredient. Accordingly, segregation of data is common in systems whose data is exponentially more dangerous as the scope of the breach increases.

Previous systems have tended to rely on tokenization, replacing a particular portion of data with a token that acts as a pointer to where the data can be retrieved. A database or document can be "de-tokenized" only by software that has credentials to access the secure data and temporarily repopulate the database or document with the appropriate values. However, tokenization has two related disadvantages. First, it can be computationally expensive to retrieve enough data for any statistical analysis or report generation to be performed. Second, tokenization is often overconservative in its protection by completely replacing all data content with an identifier that provides no information about the data it replaces. It is generally not possible to sort, filter, or perform basic statistical functions such as determining maximum and minimum values based on tokens.

Thus, there are advantages to developing novel systems that obfuscate, transform, or otherwise protect subsets of data, such that a cumulative danger that could exist from storage in a same location is avoided, but such that a limited ability to perform statistical analysis on the data is preserved.

SUMMARY

In order to address the limitations of previous systems in this field, new methods of data storage are disclosed.

A fully customizable data engine performs extract, transform, and load (ETL) tasks to protect data security. The engine accepts configuration data from users that is fine tuned based on the source application of data, the data type, the data significance, and any other considerations related to possible exposure of the data. Rather than only applying a pre-loaded configuration, authorized users may change the configuration at any time as data schemas change or enterprise requirements are updated.

The output from the fully customizable data engine is stored in a central data store (or warehouse or data lake) that is guaranteed to protect against particular foreseeable consequences if the databases from which the fully customizable data engine draws were to be accessed illicitly. Data in the central data store can be more easily used for data visualization, input to machine learning, report generation, or other analysis.

Once the central data store has been populated, query access to the data store may be relaxed somewhat since the data store contains no sensitive data directly, and de-obfuscation will require entitlements or other information that will not generally be available to users. When a particular application or user does require access to sensitive data, a number of microservices may be provided, each providing an API for lightweight queries that retrieve a well-defined subset of the data directly from systems of records and that also enforce permissions to ensure that unauthorized access to data does not occur.

The presently disclosed data segregation system not only results in superior data security in case of breach, but also provides technical advantages that can be observed even when no breach ever occurs. For example, replacing many data fields that normally require multiple bits with a single bit allows a central data store to exist on a much smaller memory footprint and use fewer computing resources compared to a central data store that stores all of the original data. The ability to compress multiple fields into a single byte opens up opportunities for novel data caching and manipulation methods, such as operations that use bitwise arithmetic rather than high-level language constructs. The use of microservices also allows the optimization of data queries instead of permitting user-formed queries that may be far less efficient.

A computer-implemented method for extracting data from separate databases and loading the data into a central data store without introducing additional security vulnerabilities is disclosed. The method begins by receiving a configuration comprising one or more transformation functions to be applied to one or more data fields. Values of the one or more data fields are extracted from the databases for a plurality of records, the values being previously tagged with metadata indicating at least a datatype for the values. Based at least in part on the configuration and the metadata tagging, a function from the one or more transformation functions is selected for each value. A second database with a central data store is populated with transformed data. Requestors are not permitted to access to pre-transformed data in the first one or more databases while being allowed access to at least some post-transformed data in the central data store.

BRIEF DESCRIPTION OF THE DRAWINGS

Other aspects, features and advantages will become more fully apparent from the following detailed description, the appended claims, and the accompanying drawings (provided solely for purposes of illustration without restricting the scope of any embodiment), of which:

DETAILED DESCRIPTION

Figure 1:
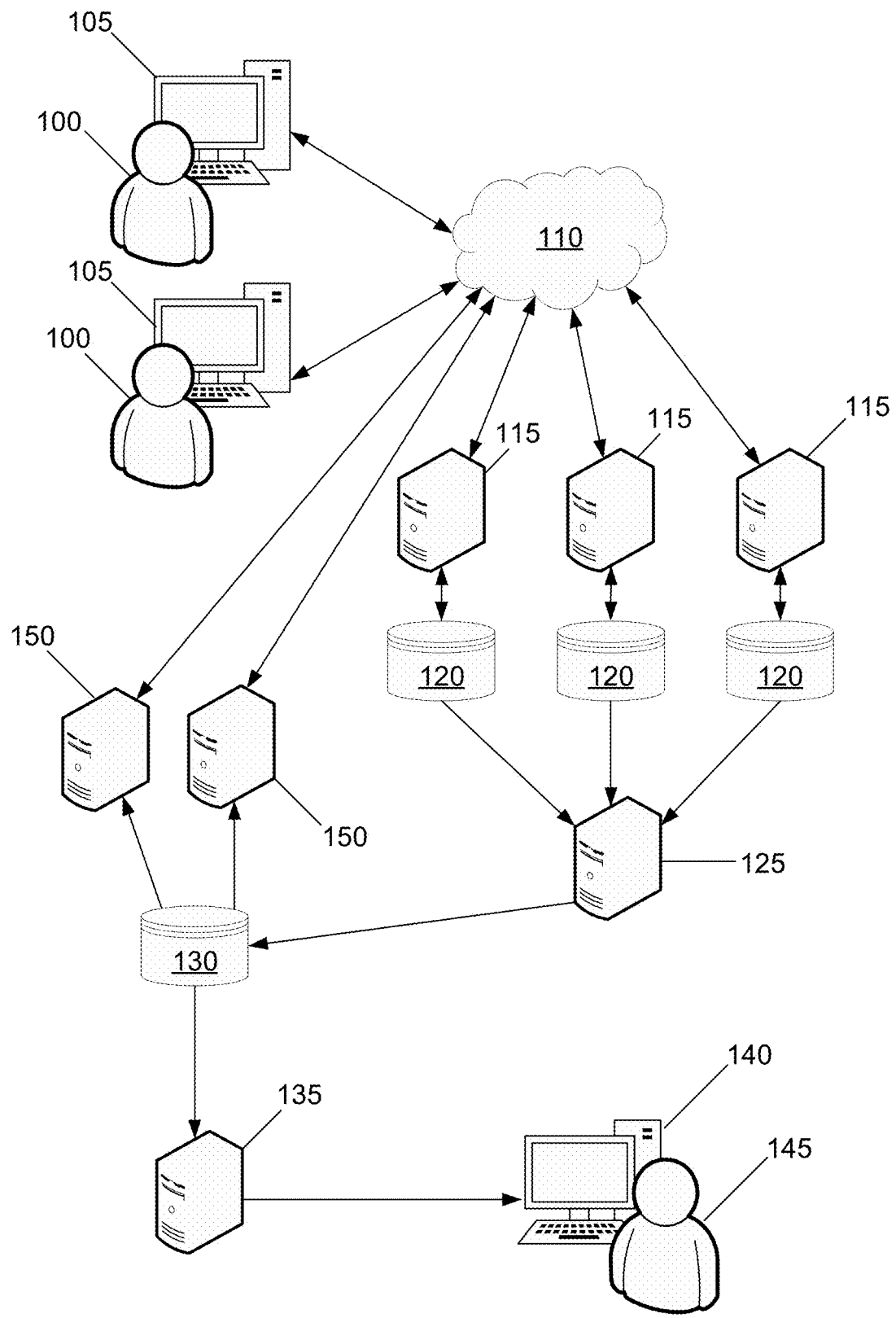
FIG. 1 depicts an example system of computing devices used to forward potentially-confidential data from one or more sources to a central data store and to enable secure use of the consolidated data.

FIG. 1 depicts an example system of computing devices used to forward potentially-confidential data from one or more sources to a central data store and to enable secure use of the consolidated data.

In the preferred embodiment depicted, any number of users 100 may each use one or more client computing devices 105 to connect to various user-facing online applications 115 through the Internet or other network 110. During these interactions, the users transmit potentially sensitive data or other protected material to the applications to be stored in systems of records 120. The potentially sensitive data may be structured, semi-structured, or unstructured, and may come from the user already denoted by its significance (such as the field tagging in a JSON, XML, or SOAP-based protocol) or with such significance only being added later by the online application 115 itself.

Each of these systems of records 120 has a largely unredacted database of the user data provided to it and needed for the associated application 115. Thus, each of these systems of records 120 represents a major security target, though each in isolation is less likely to represent a problem compared to a situation in which all are breached simultaneously. Each system contains only the data needed for a particular application, and only by overlapping the data from multiple such systems is a fuller picture able to be constructed. Each of the online applications 115 may also rely in part on data pulled from a central data store 130 described in further detail before.

The significance of the sensitive data may vary according to use case. In some embodiments, the sensitive data may be relevant from a pure security perspective, such as a password, a private encryption key, an authentication token, or an encrypted file. In other embodiments, there may be a potential security implication to the data, such as biometric markers (a fingerprint, retinal scan, facial scan, or similar information) that could be used to impersonate a user in a multi-factor authentication system. In other embodiments, the primary concern of the data may be a legal or contractual requirement that data be kept secret, or a trade secret or other information that loses its inherent value if disclosed.

When data is stored in any system of records 120, the application 115 bears the responsibility of tagging the data with appropriate metadata to allow an extract, transform, and load (ETL) or data integration layer 125 to perform various operations on the data. The ETL/data integration layer 125 pulls data from the various systems of records 120 and transforms it according to a set of fully configurable rules and methods to be described further below, in relation to FIGS. 2 and following.

The particular rule or method to be applied for any given record or data field will be defined by the previously mentioned metadata applied by the application 115. In some use cases, when metadata is lacking, incorrect, or corrupted, the identification role played by the metadata may be supplemented to some extent by regex pattern matching, text matching in field names, machine learning classifiers, or other techniques for determining the significance of a data field without actually having confirmation of the intent for the data at the time it was generated.

The transformed data is then stored in a central data store or warehouse 130. Despite the aforementioned danger of aggregating data from multiple data sources at a single point of potential failure, there is often an operational advantage to having a central data store, such as the ability to provide big data sources as inputs to machine learning, to generate reports, to perform visualizations, and to provide streamlined APIs for legitimate data access. To mitigate the dangers if an attacker is able to gain unauthorized access, transformations are performed on the data before consolidation/aggregation in the central data store. Instead of being able to, for example, pull a user's full name, political party, date of birth, income, and address from the central data store 130, an attacker might only be able to determine that there exists an individual who does have a party (but not which), who has a certain approximate age, who is within a certain income bracket, and who lives in a certain ZIP code. As a result, targeted identity theft or scamming opportunities will be greatly curtailed. One goal of the presently described process is that the central data store 130 be able to maintain a guarantee that they are "PII free" or "MNPI free."

One or more internal analysis machines 135 are intentionally provided with access to the central data store 130. These analysis machines may be used, in various example systems, to perform analytics and generate reports concerning the contents of the data store, to train a machine learning system with input data from the central data store, or to generate visualizations or interactive dashboards based on data from the central data store. One or more internal users 145 may be permitted to use a secured client computing device 140 to view visualizations, view generated reports, request the generation of additional reports, use the output of any machine learning trained on the data, or otherwise directly or indirectly receive and manipulate data from the central data store 130. Internal users 145 may also be able to access the configurations of the ETL/data integration layer 125 in order to modify, replace, or add to transformations that will be performed on any given data field.

In some cases, when non-transformed, non-redacted data from the systems of records 120 must be made available to authorized users or applications for a particular purpose, it is preferred that a set of microservices 150 be created and published to sidestep the central data store (as described further below and depicted in FIG. 4). Each microservice is pre-configured to allow read-only access to the systems of records and to return a very strict subset of data from one or more systems of records rather than permitting a more generalized SQL-like query syntax, so that information may be used with minimal risk of a security breach or unintentional leak. In order to minimize risk, the microservices will encrypt any data retrieved from the systems of records while it is in transit, and make the data available only in a temporary cache that is deleted after retrieval by the external system requesting the data. If any application requires continuous real-time access to potentially sensitive data, a microservice to provide a continuous data flow without the routine deletion will be established only when a good cause is demonstrated and all stakeholders and supervisors agree that such an extraordinary situation exists. In various use cases, the microservices 150 may provide information to users 100 who request data, to the online applications 115 that can supplement their own databases 120 with data from other systems of records, or to the analysis system 135 and users 145. For each potential recipient of data through the microservices, strict entitlement checking may be enforced by requiring, depending on the example, a password and role, a security token, presence on a same secured intranet, and/or other security measures to ensure that data from the systems of records is not widely disseminated.

Ultimately, many different configurations for systems may exist apart from that which is depicted in FIG. 1. For example, it is not required that multiple systems of records 120 exist, or that data being stored originate from multiple users 100. The data in question might have been generated exclusively server-side, and yet still include sensitive information (such as the aforementioned use case of password hashes and salts). Such server-side generated information may need to be fully redacted or transformed before being accessed by analytics, machine learning, or visualization.

Although a particular division of functions between devices is described here, other configurations are possible in which functions are divided among devices differently. For example, all of the functions of some or all of the ETL/data integration layer 125, the central data store 130, microservice servers 150, analysis system 135, and secure computing device 140 might conceivably be performed by a single device with multiple threads executing different software modules simultaneously.

Alternatively, each system or device from among the ETL/data integration layer 125, the central data store 130, microservice servers 150, and analysis system 135 may in fact be a cluster of computing devices sharing functionality for concurrent processing. Further, although several of these various computing elements are described as if they are one computing device or cluster each, a cloud-based solution with multiple access points to similar systems that synchronize their data and are all available as backups to one another may be preferable in some embodiments to a unique set of computing devices all stored at one location. The specific number of computing devices and whether communication between them is network transmission between separate computing devices or accessing a local memory of a single computing device is not so important as the functionality that each part has in the overall scheme.

Figure 2:
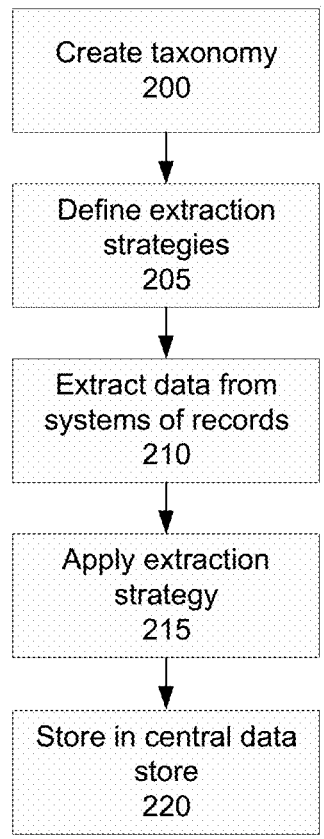
FIG. 2 depicts, in simplified flowchart form, a method of performing extraction, transformation, and loading (ETL) of data from various systems of records into a central data store.

FIG. 2 depicts, in simplified flowchart form, a method of performing extraction, transformation, and loading (ETL) of data from various systems of records into a central data store.

First, a custom data taxonomy is created based on the forms of data being stored within a system (Step 200). An example taxonomy is described in the paragraphs that follow below.

Then, for each element within the taxonomy, a transformation, obfuscation, or other strategy for that element is defined (Step 205). Examples of such transformations are included in the paragraphs that follow the example taxonomy, but in brief summary, they include: complete omission, obfuscation by masking, obfuscation by tokenization, transformation, aggregation or bucketing, and homomorphic encryption.

Either in real time, or on a regular basis via a batch or cron job or similar periodically invoked process, the ETL/data extraction layer will pull data from the systems of records (Step 210). For each value for each field, an extraction method will be selected based on how the value has been tagged within the taxonomy and what strategy is defined for that value (Step 215). Assuming that the strategy is not "complete omission", the output from that strategy will be stored in the central data store (Step 220).

In some taxonomies or strategies, a single piece of data may be classified in multiple ways or be subject to multiple extraction strategies. In such a case, the configuration will define whether one such rule overrides another, or if the data will be extracted in two or more ways and both such ways will be stored in the central data store.

Creating a Data Taxonomy

For one example embodiment, if a large enterprise were seeking to compartmentalize information and avoid dangers related to compromise or inadvertent disclosure, that organization might begin by defining a taxonomy of information that organizes each potential data field into "highly restricted", "confidential", "public", and hybrid or variable categories.

In some embodiments, particular data may be conceptually categorized within the engine as at a highest level of confidentiality or restriction (such that its disclosure creates a major existential risk to the operations of a system), at a lower level of confidentiality or restriction, as non-confidential or public, or as a hybrid of two or more of these levels based on context.

For example, in an embodiment that is intended to protect PII, the highest level of confidentiality or restriction could apply to race/ethnicity/national origin, religion/philosophy, political opinions/party membership, sexual orientation, criminal background, trade union membership, physical or mental health information, biometric information, genetic information, national state ID, tax ID, passport, driver's license, and salary/compensation/benefits data. Data fields in this set are the most restricted, because unauthorized disclosure may represent an existential risk to an organization's activities—generating criminal or civil liability by violating data privacy laws, for example.

A lower, but still elevated level of confidentiality or restriction could apply to account number, debit card number, credit card number, CVV, gender, mother's maiden name, PIN, password, security question and answer, geolocation, date of birth, and place of birth.

Depending on the context, confidential data may represent a significant risk to an organization's activities by opening up the organization to financial liability if client information was used for theft or embezzlement, However, it might not present the same level of criminal or civil liability or existential risk as the risk of data disclosure in the "highly restricted" set of data fields.

Public data might include fields such as user ID, IP address, first name, and last name. These data fields may be entitled to a minimum level of protection by virtue of a client's expectations, but there is rarely any legal complication because the data itself is generally freely disclosed by the user in the process of communicating with anyone, not just the organization protecting the client's privacy. These fields might be considered public by default, and only have a level of confidentiality for specific applications or contexts.

Hybrid or variable categories represent the reality that data might have different levels of confidentiality based on context. Examples could include fields such as a device ID, device fingerprint, cookie, full name, short name or nickname, email address, and phone number. Full names, email addresses, and phone numbers are often published in full on social media, provided freely on business cards, or otherwise available in phone books, catalogs, and other publicly available databases. When data is obtained using one of these databases, there is no additional obligation to preserve confidentiality. However, if the data is provided directly by the individual in a confidential setting such as filling out forms when signing up for a service, the individual may expect a certain privacy despite the data not having truly been secret even before the disclosure. Similarly, device IDs and fingerprints may be available to or generated by anyone on the same WiFi network as a particular device at a moment in time—but if said data is being preserved and shared with others at a later date, there may be a heightened expectation of confidentiality for that information.

After a taxonomy is created to fit the needs of an enterprise or system, the applications that are administered by that enterprise or that are part of that system will be able to categorize and tag all user-obtained or further derived data according to the taxonomy, for use by the ETL/data integration layer.

Transformations During ETL

For each data type, regardless of its level of confidentiality, a custom rule may be established in the engine to handle whether the data is brought into the central data store, and if so, how it is changed before doing so. For each data field, there is the option of complete removal, obfuscation by masking, obfuscation by tokenization, transformation, aggregation, or unchanged incorporation of the data type during the extract, transform, load (ETL) process.

If a field is not necessary for any application, analysis, visualization, etc. that depends on it, complete removal is preferred.

When a field contains sensitive data, it may be obfuscated by masking. The masking is intended to be a one-way operation, similar to a hash function, that does not provide any useful information regarding the original data's value. At most, the masking may preserve the data type, such as by replacing an integer with another integer, or an address with a false address that has a street, city, etc. Even if two records contain the same value in a field, the masked data values for those records should be different. In terms of reversibility or unmasking, the masked data should never reveal anything more than the fact that a value exists in that field, and that the true value might be accessible by a means that bypasses the central data store and queries a system of records directly. Masking is always an option for any field, though for reasons discussed below, it is generally disfavored and another strategy is favored instead.

A second strategy for obfuscating sensitive data is the use of tokenization, the replacement of a particular data field's value with a particular token that corresponds to that value. In contrast to masking, tokenization preserves the theoretical reversibility of the data so long as the tokenization function is known. Tokenization also permits some analysis of the underlying data, such as determining the mode and the overall distribution of values in the set.

Instead of obfuscation, a transformation step may be performed that "fuzzes" the data to keep the data essentially accurate for a general purpose while removing undesired specificity or precision. This transformation may also change the data type of the data. For example, a date of birth allows derivation of a current age as an integer; the age can then be used in various statistical or aggregation analysis without permitting reversing of the age to determine the exact date of birth. In other applications, bucketing the age into a range, such as "18-30", "31-40", "41-50", "51-64", or "65+" might be performed, or simply a bucket of "minor", "adult", or "senior". If the data considered includes IP addresses, the addresses might be bucketed into most significant figures, so that "128.0.0.1" and "128.10.32.99" are both replaced with "128.X.X.X" or a similar subnet mask-style bucket. If the data includes email addresses, the addresses may be stored by domain, as "X@gmail.com" and "X@hotmail.com", or similar. Phone numbers may be included only by country code, area code, and/or prefix/central office code, omitting at least the final four digits (for an American phone number) or other least significant final digits. Salaries may be replaced by particular bands or ranges, such as "<$50K", "$50K-100K", ">$100K", etc. Any other data type with a spectrum of orderable values or a shared subset characteristic may be divided up into buckets or ranges and those buckets or ranges be used instead of a precise value.

More precise data can also be replaced by arbitrarily less-precise data in other contexts. For example, a street address or geolocation data might be replaced with a street name alone, a ZIP code, a town name, a congressional district or other electoral district, a county, a state or other political subdivision, or a nation. A credit card number or debit card number may be replaced by the issuer of that card.

Some functions may rely on aggregation. For example, if a person has visited a location on six occasions and that GPS location data is associated with a timestamp for each occasion that the person was present, the data may be aggregated to simply show that a person was at a location six times total in the history, without providing information on the dates of any of those occurrences. If a person has logged in to an application or interface 20 times, that count may be stored instead of the dates, IP addresses, machine identifiers, or other information associated with those logins. If a person has visited a doctor five times, the count of visits or total amount of co-pays or total amount paid by a health insurer might be stored, without any data on the dates of visits, tests performed, or illnesses treated. If a person has made 10 purchases from an online store, each with the dollar amount and date recorded, the data may be aggregated to a total amount spent without providing any detail on the dates, locations, or particular subtotals of the purchases used to derive that information. If demographic or economic data is desired for statistical analysis, each ZIP code or town or county or state may be associated with the total number of people with a highly sensitive attribute, such as an ethnicity, religion, or income, without the identity of any individual person in the aggregation being preserved.

Some functions may rely on homomorphic encryption, a form of encryption that extracts certain features from the original data and preserves them, while obscuring others. This can permit protection of the original data before encryption, while also allowing comparison of the encrypted value to another value for similarity. For example, this is a useful property for user authentication via confidential biometric markers. It is also a useful property for genetic comparison in databases that track genealogy or allow for searching by presence of a particular gene or set of genetic markers.

Principles for Transformation Selection

First, as a general rule, if a data type is configured such that it can only have two values, or is a Boolean, it should never be subject to obfuscation by tokenization. For example, if a database contains a field to store the fact that a person is male, or the fact that a person is Hispanic, or the fact that a person is in a trade union, there is little value to transforming every "true" or "yes" value to a first shared value and every "false" or "no" value to a different second shared value. If the table is compromised, only minimal experimentation or investigation will be necessary to determine which of the two sets of individuals is the "true/yes" set and which is the "false/no" set.

For these two-value fields, instead of tokenization, it is preferred that a Boolean value be stored to represent "known/unknown" status. Whether a person is actually male or not, only the fact that their gender is known and that the data is accessible to a requestor with heightened permissions will be stored. If the original value for the field is null, the Boolean field in the data store will instead represent that the gender of that individual is unknown.

If a data type is configured to have three or more possible values, and especially if it can take a completely open or freeform set of values, then the ETL/data integration layer can use tokenization to replace each value in the data store. The value of the tokenization strategy increases the more the number of possible values increases beyond three. A field for gender that permits "male/female/nonbinary/prefer not to say/ . . . ", or a field for ethnicity that permits many options, or a field for which trade union a person is affiliated with could simply be transformed to "known/unknown" as with the Booleans. However, in a preferred embodiment, these fields could instead be replaced with a token to allow the data to be safely entered into the central data store.

For longer forms of text fields, it may be preferable to mask with a pointer that can be used to identify the original text value if a requestor is able to access the original system of records. Tokenization has limited value when a field is so free-form that it is highly unlikely a token will be re-used in multiple records, and therefore confers no benefit for aggregation queries in the future.

Example Configuration

Applying the above principles, a configuration could be established with the following rules:

Any fields representing the Boolean state of whether an individual is in a trade union, whether an individual has a particular ethnicity or race, whether an individual has a particular religion or philosophy, whether an individual has a particular criminal history status such as "felon", whether an individual has a particular sexual orientation, whether an individual is associated with a particular political party, whether an individual is a particular sex or gender, or whether an individual has a mental or physical disability will be either omitted entirely or replaced with the Boolean indicating whether the value is known in the original system of records.

Any fields representing the particular value of one of these attributes (which trade union, which race, which religion, etc.) will be tokenized as long as there exist at least three possible values for the field in the system of records.

Any fields representing a longer text form such as a full criminal history, a full list of prior residences, an explanation of medical history, a description of political activity, etc., will be masked or omitted since tokenization has limited value when a token is unlikely to be reused.

Any fields with genetic or biometric information will be subject to homomorphic encryption to enable use of that data with revelation of the data in full.

Any fields with specific numeric information that would be useful in commission of an identity theft or other fraud will be masked or transformed. For example, a passport ID or CVV of a credit card should not be stored in the central data store. A driver's license ID should not be, either, but perhaps will be transformed into other useful fields, such as the individual's state and/or a Boolean indicating that a license does exist and the individual can drive. A mother's maiden name or password would not be stored, but perhaps the length of the data as an integer number of characters will be stored.

Any fields with numeric or time-based information, such as salary and date of birth, are bucketed to ranged or derived values such as "age." Similarly, fields associated with location, such as place of birth, residence, IP address, and full phone number, may be replaced with a less specific but still accurate location, such as the state or county associated with that value.

Because each of the other transformation rules are sufficiently stringent, names do not need to be masked, tokenized, or transformed unless specific context of how the name was obtained makes the name confidential.

Figure 3:
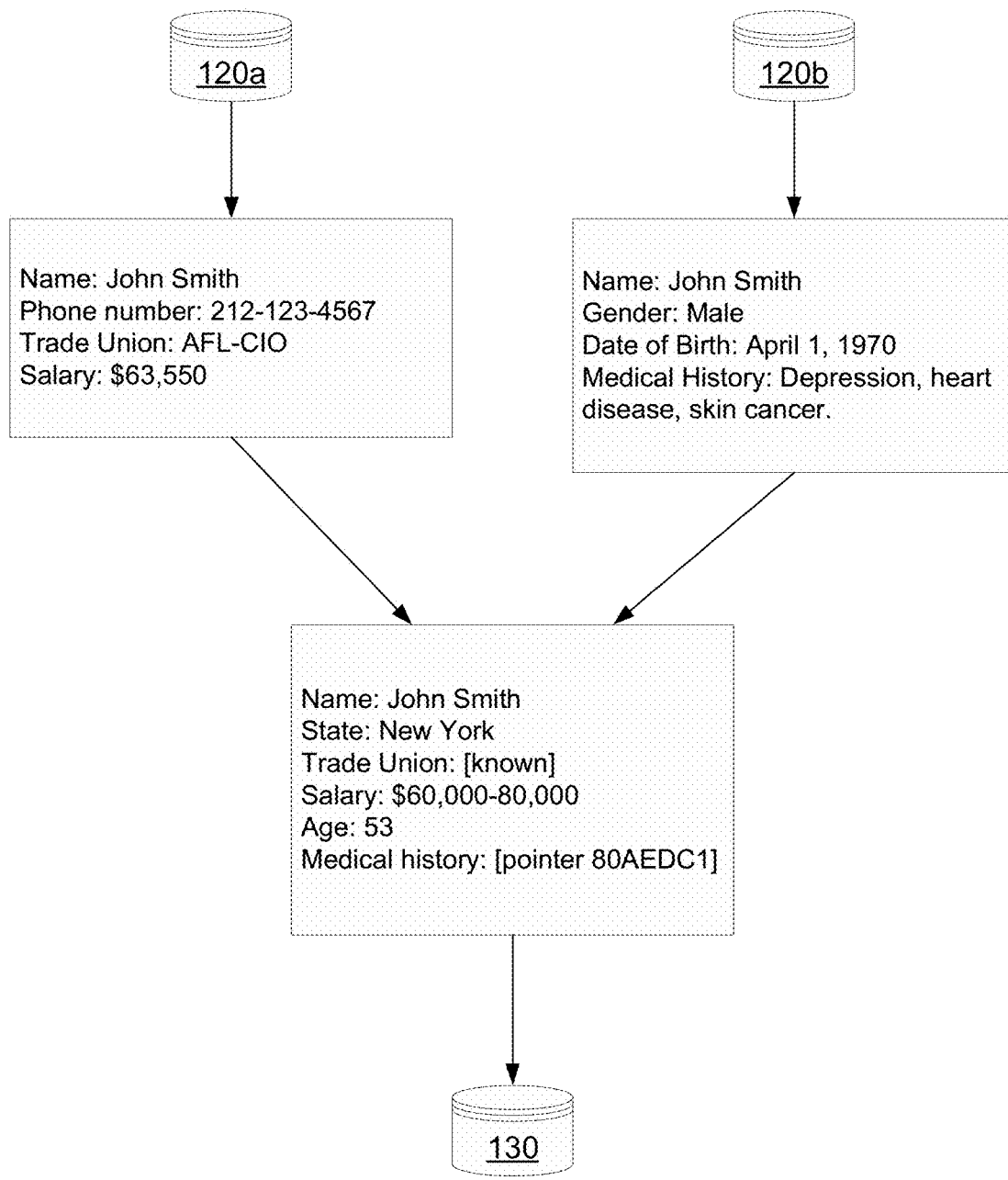
FIG. 3 depicts an example transformation of some data as it passes from a system of records to the central data store.

FIG. 3 depicts an example transformation of some data under these rules as it passes from a system of records to the central data store.

A first system of records 120*a* may store a record 300 indicating that John Smith has a given phone number, membership in a given trade union, and given salary. A second system of records 120*b* may store a different record 305 indicating that John Smith has a given gender, date of birth, and medical history.

After extraction, the central data store 130 will store (whether in a structured or a looser data lake format) certain information 310 that is still associated with John Smith, but that greatly reduces any risk to him if the information were to be inadvertently leaked or maliciously accessed. The phone number has been replaced with the state in which that phone number must have been obtained; the salary has been bucketed; the date of birth has been transformed into an age; the trade union is concealed; and the medical history is also concealed with a mask that allows a requestor to access it more directly, if entitled to.

Microservice Provision of Data

In some instances, when a dashboard or other application 135 pulls data from the central data store 130 and necessary data is encrypted, obfuscated, tokenized, or otherwise transformed and unavailable, a parallel means of accessing the raw data may be made available. As previously mentioned, microservices are an optional method of sidestepping the central data store and obtaining information directly from the systems of records. Instead of allowing direct query access to any such system of records, an API is enforced by each individual microservice to only pull data from particular fields on request. This helps to keep all distribution of information on a strictly need-to-know basis as a user or application will have to make a separate call for separate data fields rather than requesting all fields associated with a record and inadvertently exposing them through insecure coding practices or data handling. In a preferred embodiment, the microservices provisioner tracks the status of prior queries to the central data store by an individual, and does not permit access to the microservice until after a request to the central data store has already been made that returned equivalent, but obfuscated data. This prevents the development of a practice of blindly pulling potentially sensitive data from the microservices first, which increases the risk of a data leak, and ensures the microservices are only used when truly necessary. Even if such tracking is not performed before authorizing use of a microservice, it is strongly encouraged in all embodiments that some sort of demonstration be made that the microservice is necessary before granting entitlements to the microservice and allowing any user to bypass the central data store.

Figure 4:
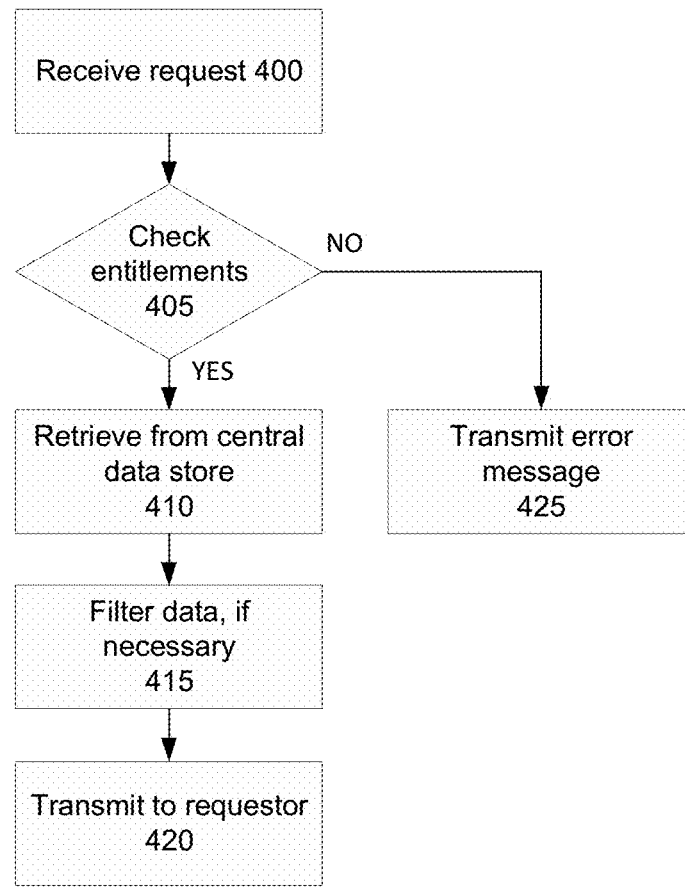
FIG. 4 depicts, in simplified flowchart form, a method of requesting data using microservices.

FIG. 4 depicts, in simplified flowchart form, a method of requesting data using microservices.

When a user or application submits a request to a microservice (Step 400), the microservice will determine whether the user or application has sufficient authorization or entitlements to access the requested information (Step 405). If the user or application does, the information will be retrieved directly from the system of records (Step 410), filtered as necessary for the particular microservice (Step 415), encrypted for safer transit (Step 420) and transmitted to a temporary cache (Step 425). The requestor is able to retrieve the data from this temporary cache (Step 430), and in any event, whether the requestor does retrieve it or not, the data will be deleted from the cache shortly afterward (Step 435) to prevent its inadvertent disclosure or malicious access at a future point in time. If data is needed after the cache has been cleared, a repeat of the initial request to the microservice will be necessary to repopulate the cache with the potentially sensitive data.

If the requestor does lack entitlements, the microservice may send an error message that lets the requestor understand the nature of the problem (Step 440) and optionally directs the requestor if any parallel API is able to access the relevant system of records.

Computing Devices Generally

Although FIG. 1 depicts a preferred configuration of computing devices and software modules to accomplish the software-implemented methods described above, those methods do not inherently rely on the use of any particular specialized computing devices, as opposed to standard desktop computers and/or web servers. For the purpose of illustrating possible such computing devices, FIG. 5, below, describes various enabling devices and technologies related to the physical components and architectures described above.

Figure 5:
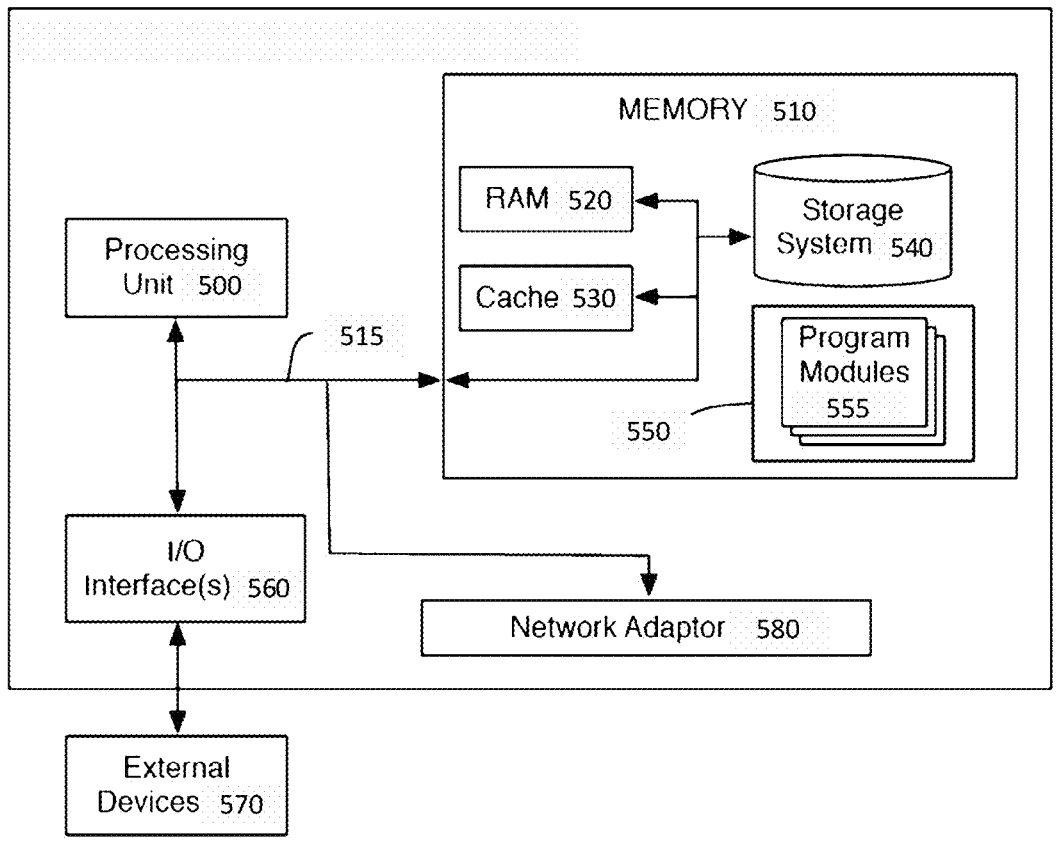
FIG. 5 is a high-level block diagram of a representative computing device that may be utilized to implement various features and processes described herein.

FIG. 5 is a high-level block diagram of a representative computing device that may be utilized to implement various features and processes described herein, for example, the functionality of the ETL/data integration layer 125, the central data store 130, the microservice servers 150, the analysis system 135, and any secure computing devices 140, or any other computing device described. The computing device may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 5, the computing device is illustrated in the form of a special purpose computer system. The components of the computing device may include (but are not limited to) one or more processors or processing units 500, a system memory 510, and a bus 515 that couples various system components including memory 510 to processor 500.

Bus 515 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processing unit(s) 500 may execute computer programs stored in memory 510. Any suitable programming language can be used to implement the routines of particular embodiments including C, C++, Java, assembly language, etc. Different programming techniques can be employed such as procedural or object oriented. The routines can execute on a single computing device or multiple computing devices. Further, multiple processors 500 may be used.

The computing device typically includes a variety of computer system readable media. Such media may be any available media that is accessible by the computing device, and it includes both volatile and non-volatile media, removable and non-removable media.

System memory 510 can include computer system readable media in the form of volatile memory, such as random access memory (RAM) 520 and/or cache memory 530. The computing device may further include other removable/non-removable, volatile/non-volatile computer system storage media. By way of example only, storage system 540 can be provided for reading from and writing to a non-removable, non-volatile magnetic media (not shown and typically referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 515 by one or more data media interfaces. As will be further depicted and described below, memory 510 may include at least one program product having a set (e.g., at least one) of program modules that are configured to carry out the functions of embodiments described in this disclosure.

Program/utility 550, having a set (at least one) of program modules 555, may be stored in memory 510 by way of example, and not limitation, as well as an operating system, one or more application software, other program modules, and program data. Each of the operating system, one or more application programs, other program modules, and program data or some combination thereof, may include an implementation of a networking environment.

The computing device may also communicate with one or more external devices 570 such as a keyboard, a pointing device, a display, etc.; one or more devices that enable a user to interact with the computing device; and/or any devices (e.g., network card, modem, etc.) that enable the computing device to communicate with one or more other computing devices. Such communication can occur via Input/Output (I/O) interface(s) 560.

In addition, as described above, the computing device can communicate with one or more networks, such as a local area network (LAN), a general wide area network (WAN) and/or a public network (e.g., the Internet) via network adaptor 580. As depicted, network adaptor 580 communicates with other components of the computing device via bus 515. It should be understood that although not shown, other hardware and/or software components could be used in conjunction with the computing device. Examples include (but are not limited to) microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may use copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for extracting data from separate databases and loading the data into a central data store without introducing additional security vulnerabilities, comprising:
   a first one or more databases containing one or more data fields;
   an extract transform and load server comprising one or more processors;
   a second database acting as a central data store for data from the first one or more databases; and
   non-transitory memory storing instructions that, when executed by the one or more processors, cause the one or more processors to:
   receive a configuration comprising one or more transformation functions to be applied to the one or more data fields;
   extract, from the first one or more databases, values of the one or more data fields for a plurality of records, the values being previously tagged with metadata indicating at least a datatype for the values;
   based at least in part on the configuration and the metadata tagging, select for each value a function from the one or more transformation functions to be performed on that value;
   populate the central data store with transformed data; and
   enforce, by limiting query access, a constraint that a requestor is not permitted to access to pre-transformed data in the first one or more databases while allowing access to at least some post-transformed data in the central data store.

2. The system of claim 1, further comprising one or more servers that host microservices, such that when the requestor makes a second query for access, the second query does not obtain data from the central data store, but rather receives information through a microservice that delineates a subset of data to be provided to the requestor.

3. The system of claim 1, wherein the one or more transformation functions include a function for obfuscating data by masking.

4. The system of claim 1, wherein the one or more transformation functions include a function for obfuscating data by tokenization.

5. The system of claim 1, wherein the one or more transformation functions include a function for transforming data by bucketing.

6. The system of claim 1, wherein the one or more transformation functions include a function for transforming data by a change in datatype.

7. The system of claim 1, wherein the one or more transformation functions include a function for transforming data by aggregation.

8. The system of claim 1, wherein the one or more transformation functions include a function for transforming data by deletion.

9. The system of claim 1, wherein an application programming interface is provided to authenticate requests to access data from the data store and to provide a subset of data from the data store to an authenticated requestor.

10. The system of claim 1, wherein the configuration comprises a first transformation function to be used on values of a first datatype when those values originate from a first application, and the configuration comprises a second transformation to be used on values of the first datatype when those values originate from a second application different from the first application.

11. A computer-implemented method for extracting data from separate databases and loading the data into a central data store without introducing additional security vulnerabilities, comprising:
   receiving a configuration comprising one or more transformation functions to be applied to one or more data fields;
   extracting, from a first one or more databases, values of the one or more data fields for a plurality of records, the values being previously tagged with metadata indicating at least a datatype for the values;
   based at least in part on the configuration and the metadata tagging, selecting for each value a function from the one or more transformation functions to be performed on that value;
   populating a second database with a central data store with transformed data; and
   enforcing, by limiting query access, a constraint that a requestor is not permitted to access to pre-transformed data in the first one or more databases while allowing access to at least some post-transformed data in the central data store.

12. The method of claim 11, wherein when the requestor makes a second query for access, the second query does not obtain data from the central data store, but rather receives information through a microservice that delineates a subset of data to be provided to the requestor.

13. The method of claim 11, wherein the one or more transformation functions include a function for obfuscating data by masking.

14. The method of claim 11, wherein the one or more transformation functions include a function for obfuscating data by tokenization.

15. The method of claim 11, wherein the one or more transformation functions include a function for transforming data by bucketing.

16. The method of claim 11, wherein the one or more transformation functions include a function for transforming data by a change in datatype.

17. The method of claim 11, wherein the one or more transformation functions include a function for transforming data by aggregation.

18. The method of claim 11, wherein the one or more transformation functions include a function for transforming data by deletion.

19. The method of claim 11, wherein an application programming interface is provided to authenticate requests to access data from the data store and to provide a subset of data from the data store to an authenticated requestor.

20. The method of claim 11, wherein the configuration comprises a first transformation function to be used on values of a first datatype when those values originate from a first application, and the configuration comprises a second transformation to be used on values of the first datatype when those values originate from a second application different from the first application.

* * * * *